Dec. 11, 1956  F. AAGAARD  2,773,685
WEIGHT RECORDER
Filed June 19, 1951  3 Sheets-Sheet 2
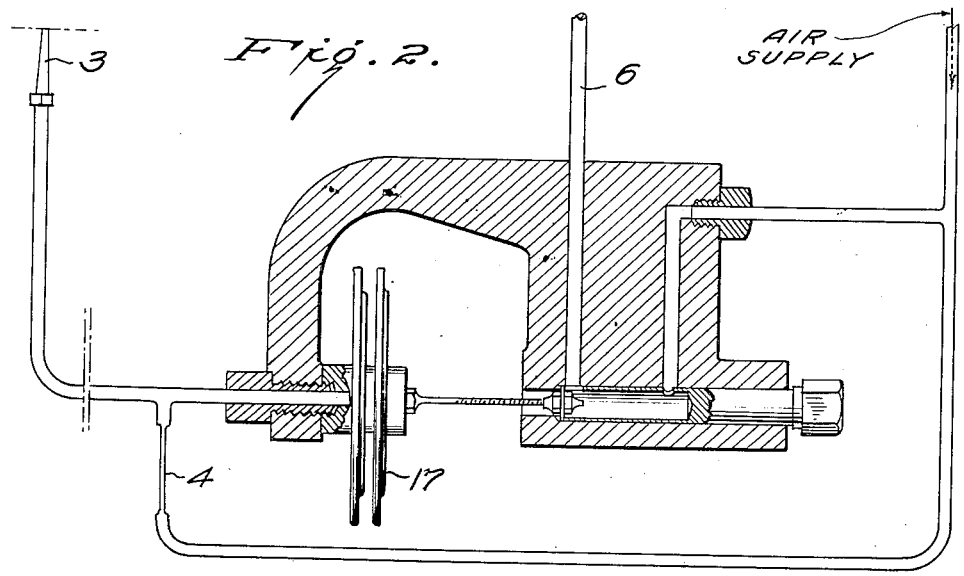
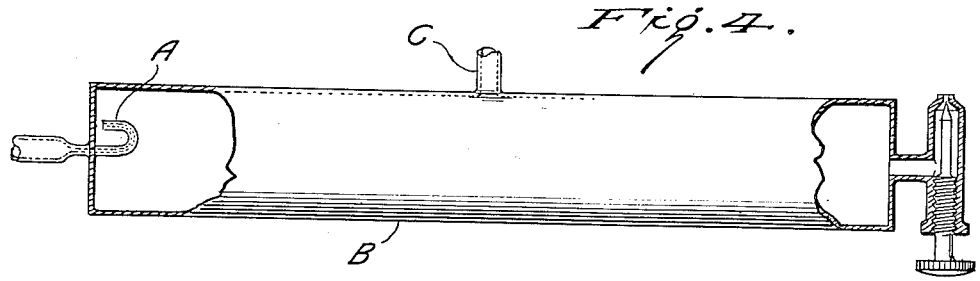
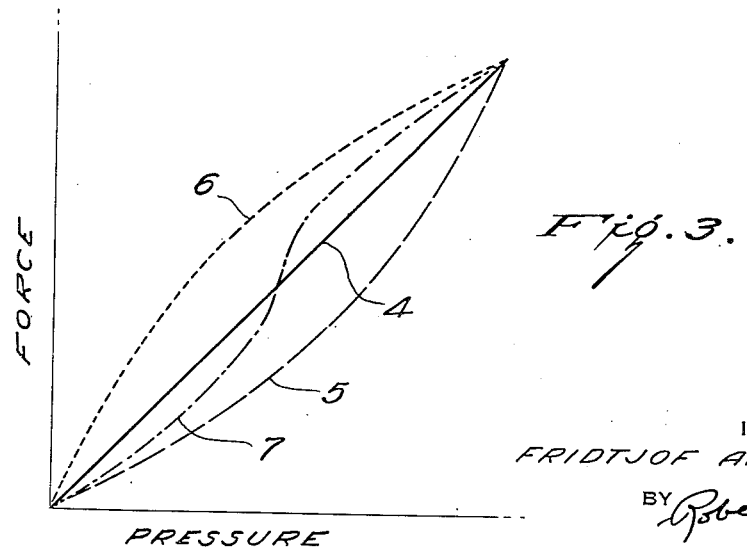
INVENTOR
FRIDTJOF AAGAARD,
BY Robert S. Kell
ATTORNEY Dec. 11, 1956　　　　F. AAGAARD　　　　2,773,685
WEIGHT RECORDER
Filed June 19, 1951　　　　　　　　　　　　3 Sheets-Sheet 3
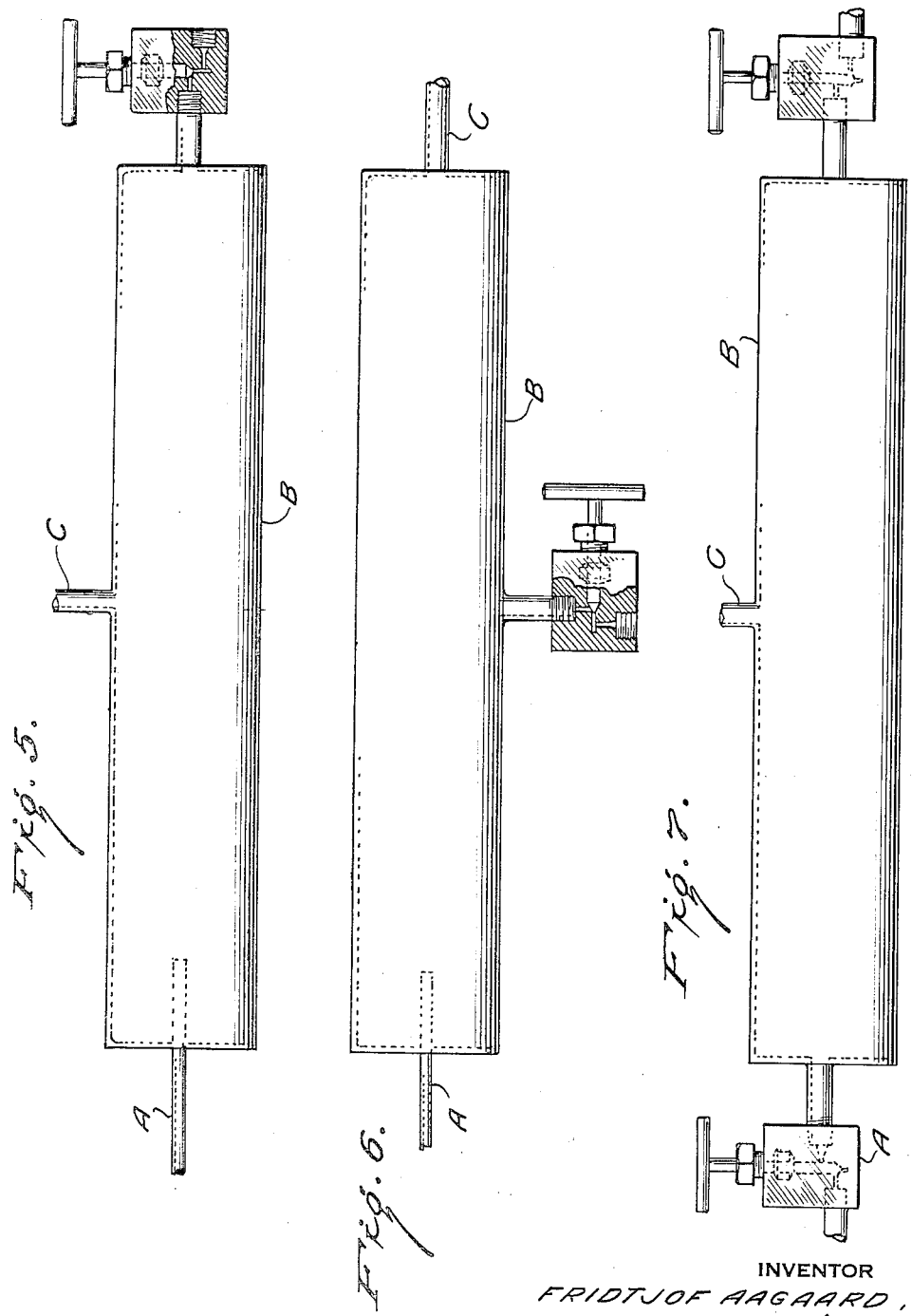
INVENTOR
FRIDTJOF AAGAARD,
BY Robert S. Kell
ATTORNEY

United States Patent Office 2,773,685
Patented Dec. 11, 1956

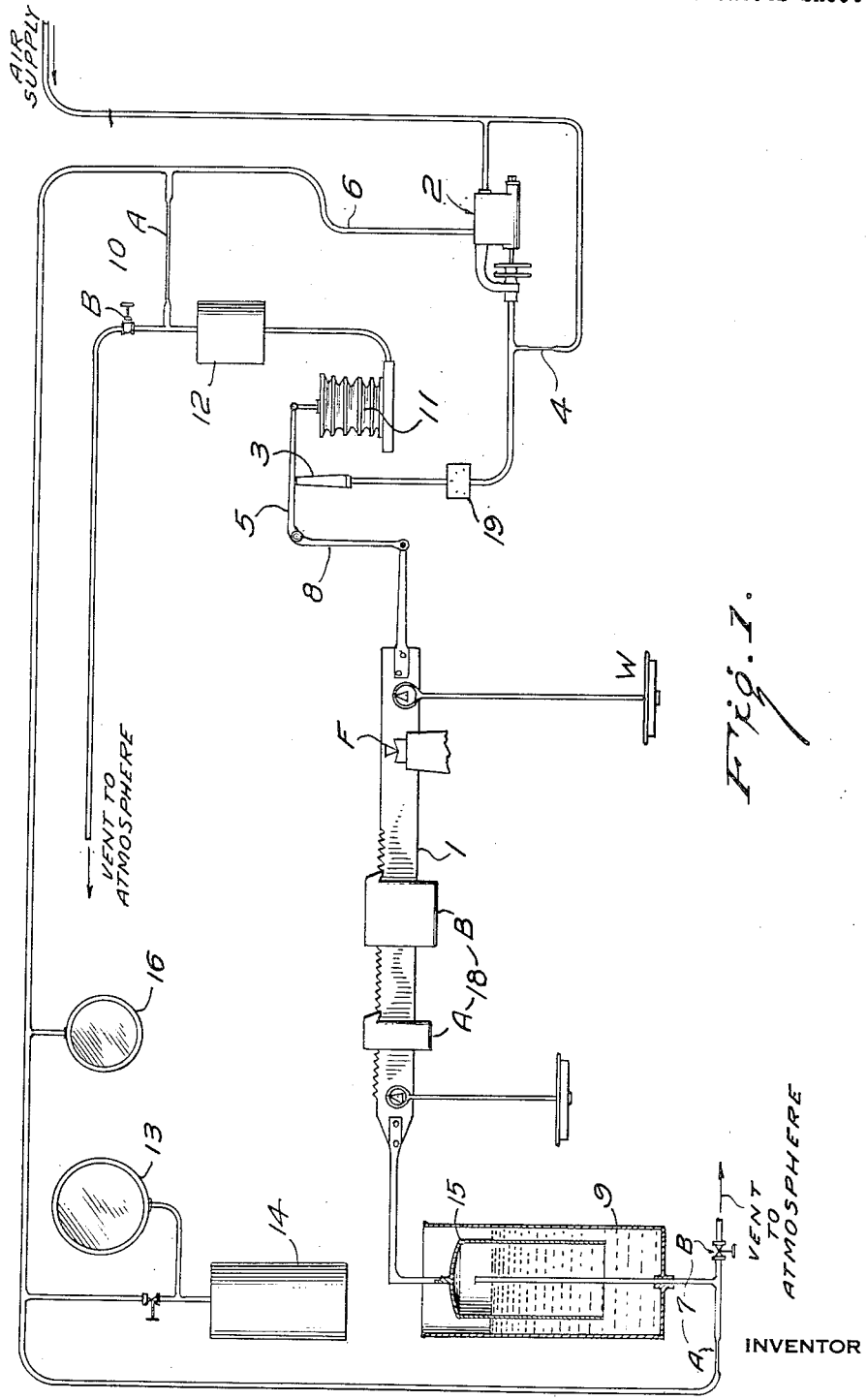

2,773,685
WEIGHT RECORDER

Fridtjof Aagaard, Rahway, N. J., assignor to American Cyanamid Company, New York, N. Y., a corporation of Maine Application June 19, 1951, Serial No. 232,441

4 Claims. (Cl. 265—5)

My invention relates to a weight recorder which provides means for remote indication, recording, and/or controlling of weights in tanks, hoppers, etc.

Determination of drying times, evaporation rates and similar chemical engineering problems has always been a time-consuming operation, as the loss of weight which accompanies such processes is not linear with respect to time and varies widely, depending on the equipment, operating conditions and product. Personnel determining such characteristics must give their undivided attention to the matter, and inasmuch as the time required in any such determination frequently exceeds 8 hours, personnel problems involving shift work and overtime are encountered. By means of the present invention, drying determinations may be made with a minimum of supervision; a provision may be made to automatically shut off the heat at any predetermined weight.

It is an object of the present invention to provide a continuously indicating automatic weight recorder, the operation of which will be limited only by the sensitivity of the apparatus on the low side and the capacity of the apparatus on the high side.

It is an advantage of the present invention that it is both simple and flexible and may be used with a conventional scale of the type that consists of a fulcrum and balance arm. Such a balance will remain in equilibrium only so long as the moments of force with respect to the fulcrum are equal and opposite.

In my automatic weight recorder the balance arm is always maintained in horizontal equilibrium, and any weight loss by the sample resulting in a smaller moment in one direction is corrected by the application of a force which equalizes the moment in the opposite direction. This continuous application of a variable force to one end of the balance arm is accomplished by varying the pressure in a manostat connected to the balance arm. My recorder may be so constructed that the pressure in the manostat will vary inversely as the weight of the sample. Accordingly, the weight loss may be read directly from a properly calibrated pressure gauge.

My apparatus will be explained more fully in connection with the accompanying drawings in which—

Figure 1 is a schematic diagram of my automatic weight recorder;

Figure 2 is an enlarged view of a reverse relay;

Figure 3 is a graphic representation of the relation between pressure in my apparatus and the force applied to the balance arm;

Figure 4 is an enlarged view of the pressure reduction system identified in Fig. 1 by the numerals 7A and 7B; and Figures 5 through 7 illustrate possible modification of Fig. 4.

The different elements which cooperate to automatically record weight changes in a manner herein described and claimed may be identified by referring to Figure 1. In that diagram, 1 is a balance arm of standard construction which supports the sliding weights 18A and 18B;

W is the weight or load on the balance suspended from fulcrum F. 2 is a reverse relay of the type illustrated in Figure 2. 3 is a pilot nozzle. 4, 7A, and 10A are capillary tubes. 5 is a flapper valve, one end of which is connected through pivot joints and linkage 8 to the balance beam. The other end of flapper valve 5 is connected through a pivot linkage to reset bellows 11. 6 is a conduit and 7B is a valve of the type illustrated in Figure 4. 15 is a cylinder and the movable part of manostat 9. 10B is a valve and 12 and 14 are surge tanks. 13 and 16 are pressure gauges. 19 is a manual adjustment for positioning nozzle 3 with respect to flapper 5.

My weight recorder is best explained by reference to Fig. 1. Air at 22 pounds pressure is supplied to reverse relay 2 and through a fixed restriction 4 to pilot nozzle 3. The pressure in the pilot nozzle will vary, depending on the spacing between this nozzle and flapper valve 5. When this flapper valve closely approaches the end of nozzle 3, the pressure within the nozzle will approach the full line pressure of 22 lbs. On the other hand, when the flapper valve is well removed from the end of the nozzle, there is nothing to prevent the air from rushing out and the pressure within the nozzle may drop to atmosphere pressure. A change in the nozzle pressure of 0 to 20 lbs. corresponds to a total movement of the flapper valve amounting to 0.004 inch.

The reverse relay will vary the pressure in the output conduit 6 in inverse proportion to the pressure in the nozzle 3.

The operation of the reverse relay may be determined by reference to Fig. 2. As the pressure in nozzle 3 approaches the full line pressure of 22 pounds, the bellows 17 is extended and the valve attached thereto is moved to close the opening to conduit 6. It will be apparent from the above explanation that high pressure in nozzle 3 results in low pressure in conduit 6. Low pressure in nozzle 3 will have the reverse effect of collapsing bellows 17 and opening conduit 6 to the full line pressure. Thus when the nozzle pressure is 20 lbs., the pressure in line 6 will be 0. The pressure in conduit 6 will rise to the full 20 lbs. as the pressure in nozzle 3 drops to zero. Fig. 2 is a sectional view of one type of reverse relay which has given satisfactory performance.

The combination of a fixed resistance 7A and an adjustable bleed to the atmosphere 7B serves to adjust the ratio of the relay output pressure (as measured by recording gauge 13) to effective balancing pressure in manostat 9 to any value required to maintain equilibrium. The elements identified as 7A and 7B in Fig. 1 are of primary importance to the best performance of this apparatus as will be explained below. Ballast tank 14 absorbs minor pressure variations in the relay output line 6.

From consideration of Fig. 1, it becomes apparent that when flapper 5 rises 0.004 inch, resulting in a pressure drop in the nozzle to atmosphere pressure and a pressure increase in line 6 to 20 lbs., the pointer at the end of the balance beam will drop about ½ inch. The effect of this movement is to submerge a larger part of the closed cylinder 15 in the liquid of the manostat. This submergence would cause a weight error of some consequence in the low ranges, so I have provided a reset bellows 11 to prevent this wandering of the balance arm from the horizontal position.

The manner in which this reset bellows operates with the other elements of my apparatus may be understood from the following step-by-step description of the operation and function of the various elements.

Assume that a weight recorder, illustrated in Figure 1, serves to detect and record loss of weight during the drying of a material containing 25% moisture. A 40 pound sample is counter-balanced with the weights 18A and 18B so that the beam 1 is in a horizontal position with zero pressure within the manostat (valve 7B wide open to the atmosphere). Since the expected loss of weight is 10 pounds (25%) the beam weights are moved away from the fulcrum a distance corresponding to ten pounds, thereby simulating the expected weight loss on the scale. The scale is now out of balance with the beam fully displaced. This position of the beam lifts flapper valve 5 from pilot nozzle 3 by means of linkage 8 and the full inverse pressure of twenty-two pounds from the reverse relay is impressed on conduit 6. The position of nozzle 3 is manually adjusted vertically with respect to the flapper valve so that the valve 7B may be throttled to a point where the effective pressure in the manostat 9 just balances the beam in a horizontal position with an output pressure on line 6 of twenty pounds, as indicated on pressure gauge 16. Thus, by the alternate adjustment of nozzle 3 and valve 7B, the balance arm, although 10 pounds out of balance with the load, is maintained in a horizontal position with twenty pounds air pressure in line 6.

At this time, there will be a super atmospheric pressure in tank 12 and bellows 11, which are connected to conduit 6 through capillary 10A. The valve 10B is adjusted to permit air to escape to the atmosphere at such a rate that the pressure drop across the capillary 10A results in a pressure of approximately two and one-half pounds in the bellows 11. This pressure within the bellows extends the bellows end of flapper 5 to a maximum vertical position. If this adjustment of the valve 10B causes any change in the horizontal position of the beam 1 or the pressure in line 6, a slight readjustment of valve 7B and/or nozzle 3 will restore beam 1 to the horizontal position with twenty pounds pressure in line 6.

The beam weights are now moved toward the fulcrum, a distance corresponding to 10 pounds, which brings the scale back into balance with the weight W. The pressure within cylinder 15 tends to elevate the beam 1 above the horizontal position, but this movement quickly closes the flapper valve and brings the output pressure in line 6 to zero. The beam 1, therefore, returns to the horizontal position in exact balance with the weight W and with zero pressure in the manostat 9. The pressure, which in line 6, changes from twenty pounds to zero, results in a corresponding change of pressure in tank 12 from two and one-half pounds to zero. This pressure drop within the bellows 11 causes it to contract to its minimum vertical position. This keeps the flapper valve in a closed position.

The weight recorder is now properly adjusted for operation and will record automatically the rate of evaporation. Any loss of weight by evaporation will cause the beam 1 to deviate from its balance position and result in lifting flapper valve 5 from pilot nozzle 3 to a point where the output pressure, and consequently the balancing pressure in the manostat 9, maintains the beam in a horizontal position. The return of the beam 1 to a horizontal position would lower flapper valve 5 and reduce the pressure in line 6, were it not for the compensating effect of bellows 11 which acts in the opposite direction to raise flapper valve 5 as the pressure in line 6 increases.

Since the effective balancing pressure within the manostat, and the relay output pressure are in linear ratio when the elements 7A and 7B are arranged as shown in Figure 4, the relay output pressure becomes a true indication of weight loss as the evaporation proceeds. Recording pressure gauge 13 is isolated from sudden pressure changes in line 6 by means of surge tank 14, and provides a continuous record of weight. Each pound increase in pressure on the recorder gauge 13 indicates the loss of one-half pound of weight on the scale.

The assumed weight loss of 10 pounds could be any other value, limited only by the sensitivity of the scale on the low side and the capacity on the high side.

It is highly desirable for the correct operation of my apparatus that the ratio of the effective balancing pressure in the manostat to the relay output pressure be linear. The manostat is very sensitive to pressure change, since it is connected to the balance arm in such position that a force of 1 gram will counterbalance a weight of 1 lb. The design of reducer 7A and valve 7B therefore assumes importance, as the linear ratio required is dependent upon these two elements of my weight recorder.

The relationship between gas pressure (pressure in line 6) and the force applied to the balance arm is shown in Fig. 3. The curves produced in Fig. 3 were determined experimentally and illustrate the reducer-valve combinations of Figs. 4 through 7. In all the systems illustrated (Fig. 4 through Fig. 7) the reducer A is a capillary having an internal diameter of 0.010 inch and a length of 1 to 1¾ inches. The chamber B is a pipe having an internal diameter of about 1½ inches and C is the conduit outlet to the manostat.

It will be noted that in the system of Fig. 5, the high velocity flow of gas past the outlet C sweeps some of the gas out of the manostat and results in the error illustrated by curve 5, Fig. 3.

Curve 6 of Fig. 3 illustrates the effect of changing the position of the manostat connection as shown in Fig. 6. The high velocity gas seems to pile up in the manostat outlet.

The errors of the arrangement illustrated by Figs. 5 and 6 may be reduced but not eliminated, by using two needle valves as indicated in Fig. 7. The results obtained are those shown by curve 7 of Fig. 3.

The system which most closely approached a true linear relationship as shown by line 4 of Fig. 3 is illustrated by Fig. 4. The capillary is so arranged that there is no rapid flow of gas past the outlet C. The valve shown is a Bunsen burner valve and I believe that the turbulence caused to the gas stream by this particular type of valve is partially responsible for the desirable results obtained, since this arrangement helps to prevent a rapid gas flow past the opening C. The maximum deviation from curve 4 of Fig. 3 observed with this arrangement was less than one percent.

The above description is illustrative only and is not limited to the pressure and dimensions described. In general, I prefer to operate with a line pressure of about 20 lbs. or less, but higher pressures may be used. The flapper valve-nozzle combination seems to work better when the pressure in the nozzle is low, that is, from 0 to 2 lbs. per square inch. In this instance, a multiplying relay may be used in place of relay 2. As might be expected, an increase in the volume of air flowing into the manostat will result in more rapid movement of the beam and decrease the stability of the recorder. This feature is not critical, however, as the air volume may be doubled by cutting the length of the capillary 7A in half without instability.

It is also obvious that the reverse relay 2 of Fig. 1 may be a direct relay if the linkage of the flapper valve 5 is modified to obtain the action desired.

The balance arm and fulcrum illustrated in Fig. 1 are not essential elements of the present invention, as the weight to be determined may be suspended directly from the movable cylinder of the manostat and the nozzle relocated and operated by a flapper attached to the movable cylinder. Under such circumstances the reset bellows could be eliminated.

A weight recorder of the type herein described may find use for remote indication of the weight in a tank and it may be used as a recording controller to feed liquid into a tank at controlled rates, at the same time providing a record of the actual weight added. This instrument may replace such devices as proportioning pumps, rotometers and constant head tanks with orifices.

I claim:

1. The combination of a manostat; a pipe vented at one end to the atmosphere through a Bunsen burner valve; said pipe having sealed into the other end a small capillary tube, the end portion of which is so orientated that it is directed away from said Bunsen valve; a conduit connecting said manostat to said pipe at a point between said Bunsen valve and said capillary tube.

2. The combination of a manostat; a pipe vented at one end to the atmosphere through a valve, said valve comprising a cylinder and an opening at one end of said cylinder smaller than said cylinder, and a rod within said cylinder of smaller diameter than said cylinder but sufficiently large to close said opening, and means for moving said rod concentric with the axis of said cylinder to open or close said opening; said pipe having sealed into the other end a small capillary tube, the end portion of which is so orientated that it is directed away from said valve; a conduit connecting said manostat to said pipe at a point between said valve and said capillary tube.

3. In an apparatus adapted to the continuous automatic recording of weight change, the combination of a flapper valve, a nozzle, a balance beam, a manostat and a bellows; said manostat comprising an inverted hollow chamber closed at the top suspended concentrically in a larger cylinder, said larger cylinder being partially filled with a liquid, said inverted chamber being connected to one arm of a balance beam, a vertical passageway communicating from a point above the liquid level within said inverted chamber to a point outside the said larger cylinder, one end of said flapper valve being connected to one end of said balance beam; and the other end of said flapper valve being connected to said bellows; and communicating means between said nozzle, the said vertical passageway communicating from the said inverted chamber, and the said bellows whereby any change in pressure within said nozzle will be translated to said bellows and thereby move said flapper valve so as to avoid any change in the position of said balance beam.

4. The combination of a manostat; a pipe vented at one end to the atmosphere through a Bunsen burner valve, said pipe having sealed into the other end a small capillary tube the end of which is so orientated that it is directed away from said Bunsen valve; a conduit communicating with said manostat at a point between said Bunsen valve and said capillary tube; a pivoted balance beam; the movable element of said manostat being connected to the one end of said balance beam; the other end of said balance beam being connected to one end of a flapper valve; and the other end of said flapper valve being connected to a bellows; a nozzle positioned adjacent to said flapper valve; and communicating means between said nozzle and said bellows, whereby any change in pressure within said nozzle will be translated to said bellows and thereby move said flapper valve so as to avoid any change in the position of said balance beam; communicating means between said nozzle and a pressure relay; and automatic recording pressure gauge which measures the output pressure of said pressure relay, said pressure relay being actuated by pressure variation within said nozzle resulting from movement of said flapper valve with respect to said nozzle; and communicating means between the output of said pressure relay and said capillary tube.

References Cited in the file of this patent

UNITED STATES PATENTS

| | | |
|---|---|---|
| 693,990 | Arndt | Feb. 25, 1902 |
| 1,012,632 | Groome | Dec. 21, 1911 |
| 1,874,704 | Johnson | Aug. 30, 1932 |
| 2,117,800 | Harrison | May 17, 1938 |
| 2,240,243 | Mason | Apr. 29, 1941 |
| 2,285,540 | Stein | June 9, 1942 |
| 2,313,509 | Bohannan | Mar. 9, 1943 |
| 2,401,046 | Briscoe | May 28, 1946 |
| 2,451,425 | Allwein | Oct. 12, 1948 |
| 2,484,557 | Eckman | Oct. 11, 1949 |
| 2,500,407 | Segerstad | Mar. 14, 1950 |
| 2,517,718 | Sall | Aug. 8, 1950 |